US007685734B1

(12) United States Patent
Burger

(10) Patent No.: US 7,685,734 B1
(45) Date of Patent: Mar. 30, 2010

(54) PIPE FITTING TEMPLATE

(76) Inventor: Tracy Lee Burger, 905 Pratt St., Longmont, CO (US) 80501

( * ) Notice: Subject to any disclaimer, the term of this patent is extended or adjusted under 35 U.S.C. 154(b) by 70 days.

(21) Appl. No.: 12/168,984

(22) Filed: Jul. 8, 2008

Related U.S. Application Data

(60) Provisional application No. 60/949,784, filed on Jul. 13, 2007.

(51) Int. Cl.
*G01B 3/14* (2006.01)

(52) U.S. Cl. .......................... 33/566; 33/563; 33/529; 33/1 G

(58) Field of Classification Search .................. 33/1 G, 33/21.3, 412, 563, 566, 529
See application file for complete search history.

(56) References Cited

U.S. PATENT DOCUMENTS

| | | | | |
|---|---|---|---|---|
| 2,314,950 | A | 3/1943 | Pope | |
| D155,687 | S | 10/1949 | Curtis | |
| 2,844,874 | A * | 7/1958 | Sury | 33/21.3 |
| 2,899,750 | A * | 8/1959 | Becroft | 33/529 |
| 3,209,459 | A * | 10/1965 | Fish, Jr. | 33/529 |
| 3,816,931 | A | 6/1974 | LaMar | |
| 4,118,854 | A | 10/1978 | Krafft | |
| 4,524,522 | A * | 6/1985 | Perry | 33/563 |
| 4,573,302 | A | 3/1986 | Caretto | |
| 4,936,020 | A * | 6/1990 | Neblett | 33/566 |
| 4,965,943 | A * | 10/1990 | Adams | 33/758 |
| 5,652,871 | A | 7/1997 | Steinman et al. | |
| 5,652,976 | A | 8/1997 | Hopper | |
| 5,692,357 | A | 12/1997 | McCain | |
| 6,077,000 | A | 6/2000 | Gibbons et al. | |
| 6,282,852 | B1 | 9/2001 | Walcker | |
| 6,317,993 | B1 * | 11/2001 | Loyd | 33/529 |
| 6,516,531 | B2 | 2/2003 | Woerlein et al. | |
| 6,530,180 | B2 | 3/2003 | Edmondson et al. | |
| 6,560,887 | B2 * | 5/2003 | Byrnes | 33/529 |
| 6,681,140 | B1 | 1/2004 | Heil | |
| 6,842,993 | B1 | 1/2005 | DiMauro | |
| 7,568,295 | B1 * | 8/2009 | Strain | 33/566 |
| 2002/0023363 | A1 | 2/2002 | Woerlein et al. | |
| 2003/0061722 | A1 | 4/2003 | Bradley | |
| 2004/0054568 | A1 | 3/2004 | Bradley et al. | |
| 2005/0004784 | A1 | 1/2005 | Schettine | |
| 2005/0027588 | A1 | 2/2005 | Current | |
| 2008/0148587 | A1 * | 6/2008 | Goodrich | 33/529 |

* cited by examiner

*Primary Examiner*—G. Bradley Bennett
(74) *Attorney, Agent, or Firm*—Rick Martin; Patent Law Offices of Rick Martin, P.C.

(57) ABSTRACT

A template allows a piping system installer to create a pipe fitting outline without requiring the installer to consult a manufacturer's catalog and without requiring the installer to plot dimensions with a measuring instrument. The template comprises marking holes corresponding to key locations of one or more pipe fittings. The installer marks the outline through template marking holes using a piece of chalk or other marking instrument. The installer removes the template and is left with an outline on the structure's surface comprising the pipe fitting's key locations. A set of fifty templates could cover almost all the needs of most installers with hundreds of different fitting dimensions covered in a set of fifty templates.

7 Claims, 9 Drawing Sheets

SAN TEE

| SIZE | D | F | E |
|---|---|---|---|
| 2 | 4 1/2 | 6 7/8 | 4 1/2 |
| 3 X 2 | 4 1/2 | 6 7/8 | 5 |
| 3 | 5 | 8 | 5 |
| 4 X 2 | 4 1/2 | 6 7/8 | 5 1/2 |
| 4 X 3 | 5 | 8 | 5 1/2 |
| 4 | 5 1/2 | 9 1/8 | 5 1/2 |

PIPE FITTING TEMPLATE

CROSS REFERENCE APPLICATIONS

This application is a non-provisional application claiming the benefits of U.S. provisional application No. 60/949,784 filed Jul. 13, 2007.

BACKGROUND OF THE INVENTION

Modern structures, such as buildings and ships, generally comprise piping systems used in one or more applications. Examples of piping systems include but are not limited to cold and hot water supply lines, sanitary sewer lines, gas distribution lines, central vacuum system suction lines, and conduits for electrical and/or communication systems.

An installer generally constructs a piping system at the site of a structure using materials including sections of pipe and various pipe fittings. Pipe fittings are used to connect sections of pipe together. For example, when a pipe must make a ninety degree turn, a ninety-degree elbow fitting may used to connect two sections of pipe together at a ninety-degree angle. As another example, when a branch line is to be connected to a main line, a tee fitting may be used to connect a section of pipe constituting the branch line to two sections of pipe constituting the main line.

When an installer is installing a piping system in a structure, the installer will frequently draw an outline of the piping system on a surface of the structure before installing the piping system. The outline enables the installer to determine where pipes are to be installed, the correct lengths of sections of pipes, and where pipes should be fastened to the structure. The outline may be marked on the structure's surface with chalk or in another suitable manner. For example, if an installer is going to install a plumbing system above a building's ceiling, the installer will generally draw with chalk an outline of the plumbing system on the building's floor. Straight lines may be used to indicate the center of pipe sections, and circles may used to indicate connection points. The installer may be able to use the outline to determine where pipes are to be fastened above the ceiling and to determine the correct length of pipes.

An installer will typically construct a piping system outline in the following manner. First, the installer will mark key locations of the piping system on a surface of the structure, such as the floor of a building. By way of example and not of limitation, a key location may be a location where a drain line connects to a plumbing fixture. The installer may determine key locations by referring to physical features of the structure (e.g. a collar that provides an opening for a pipe), and/or the structure's design specification (e.g. a blueprint). The installer will next plot lines representing pipes from the key locations to connection points. If a connection point comprises a fitting, the installer will have to construct an outline of the fitting showing where pipes connect to the fitting. To construct an outline of the fitting, the installer will typically look up the fitting's dimensions in a manufacturer's catalog. The installer will then create the outline of the fitting by plotting the fitting's dimensions on the structure's surface using a tape measure or other measuring instrument. For example, if an installer were to create an outline of an elbow fitting on the floor of a building, the installer would first look up the length of each section of the appropriate elbow fitting in the fitting manufacturer's catalog. The installer would then plot the length of each section of the elbow on the building's floor using a tape measure or other measuring instrument.

Unfortunately, the process of creating a pipe fitting outline by looking up dimensions in a manufacturer's catalog and plotting out the appropriate measurements is time consuming and error prone. The installer is required to spend time searching for the appropriate fitting in the manufacturer's catalog and then noting the appropriate dimensions. The installer needs to take time to accurately create an outline of the fitting using a measuring instrument such as a tape measure. The installer may make errors by obtaining the wrong dimensions from the manufacturer's catalog and/or by incorrectly plotting the dimensions on the structure's surface.

A template is disclosed which may enable an installer to quickly and easily create a pipe fitting outline. The template allows an installer to create a pipe fitting outline on a structure's surface without having to refer to a manufacturer's catalog and without having to plot dimensions with a tape measure or other measuring instrument.

SUMMARY OF THE INVENTION

The primary aspect of the present invention is to provide a system to create a pipe fitting outline on a structure's surface is disclosed. The system consists of one or more templates which allow a piping system installer to create an outline of one or more pipe fittings. The template contains marking holes corresponding to key locations of one or more pipe fittings.

The piping system installer selects a template which comprises marking holes for the appropriate pipe fitting. The installer places the template at the location on structure's surface where the pipe fitting outline is desired. Using a marking instrument such as a piece of chalk, the installer marks the ends of the fitting by pressing the marking instrument through the appropriate marking holes in the template. The installer removes the template and is left with an outline on the structure's surface comprising the pipe fitting's key locations.

These and other features and advantages of the pipe fitting template system reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope. Other aspects of this invention will appear from the following description and appended claims, reference being made to the accompanying drawings forming a part of this specification wherein like reference characters designate corresponding parts in the several views.

Why the Trace Plate Stencils?

With the take-off dimensions of 54 frequently used fittings, from three popular manufacturer's, most layouts can be drawn without using manufacturing guide books.

Use the Trace Plate Stencils for quick layout of hangers and imbeds before the concrete pour and right up to the last fitting is installed.

Directions for Use

1. Transfer all sleeve locations to floor with laser bob or plumb bob.
2. With chalk line, chalk pipe routing on floor.

3. Place the correct stencil at the intersecting lines and mark the slots for the fitting that is needed, with a marking tool. This requires the knowledge of a pipe fitter.
4. Lift Trace Plate and repeat for all fittings provided on the stencil.
5. Measure between fitting marks and subtract ¼th inch for 2 no hub bands to get pipe length.
6. At fittings, turning up or down, use bottom edge and mark desired fitting lines.
7. Keep in mind, you have a straight edge, rulers, 45 degree and 90 degree marking capabilities and can be used for marking hanger locations, or get a fitting take-off dimension by simply measuring Stencil fitting slots.
8. For double combos, wyes, santees, etc. flip the Trace Plate over and mark the opposite branch.

(Notice different dimensions of two fittings on Sanitary tee stencil)

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
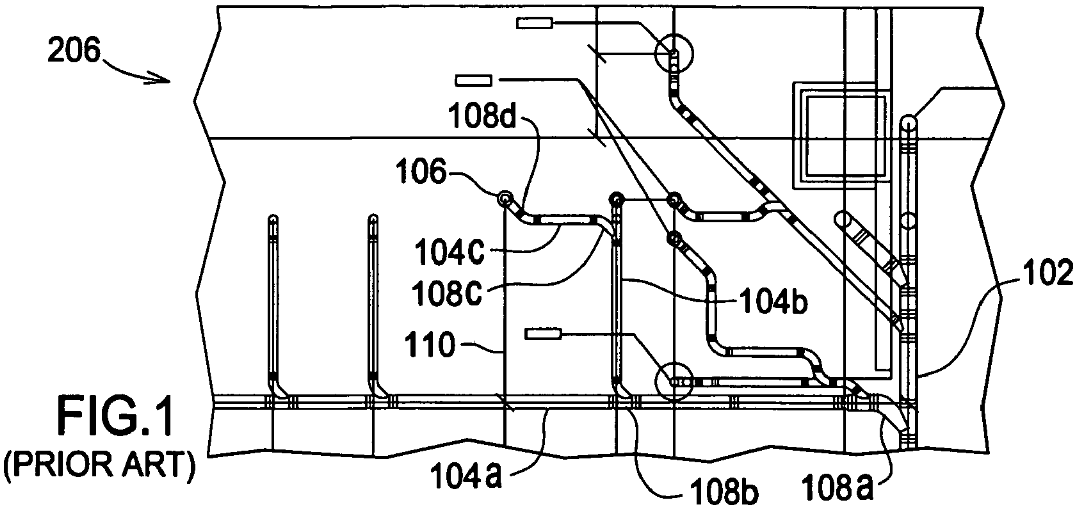
FIG.1 (PRIOR ART)
FIG. 1 (prior art) is a top plan view of an example of a building plumbing system blueprint.

FIG. 1 is a top plan view of an example of a building plumbing system blueprint 206. Blueprints generally show the design details of a system of a structure. For example, the blueprint of FIG. 1 shows the design of a drainage line system of a section of a building. The blueprint of FIG. 1 comprises information such as that main pipe or line 102 originates from another section of the building, and that branch line **104*a* is connected to main line 102 via pipe fitting 108*a***.

A piping installer may use a blueprint to determine what pipes need to be installed and where they should be located. For example, the installer may review the blueprint of FIG. 1 and determine that connection point 106 is located distance 110 from branch line **104*a*. The installer may also determine that connection point 106 is connected to branch line 104*a* via branch lines 104*b* and 104*c* as well as pipe fittings 108*b*, 108*c*, and 108*d***.

Figure 2:
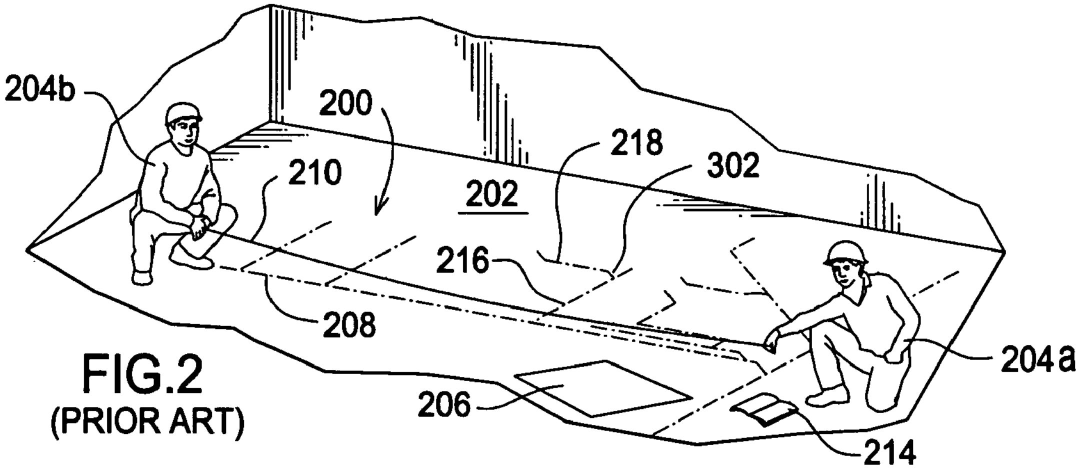
FIG.2 (PRIOR ART)
FIG. 2 (prior art) is a top perspective view of two installers creating a piping system outline on the floor of a structure.

FIG. 2 is a top perspective view of installers **204*a* and 204*b* drawing piping system outline 200 on floor 202** of a structure. Piping system installers frequently create an outline of a piping system on a surface of the structure (e.g. the structure's floor) before installing the piping system. The piping system outline helps installers determine where pipes should run, the correct lengths of sections of pipes, and where pipes should be fastened to the structure. The outline may be drawn by using a marking instrument such as chalk or by other suitable means.

Figure 10:
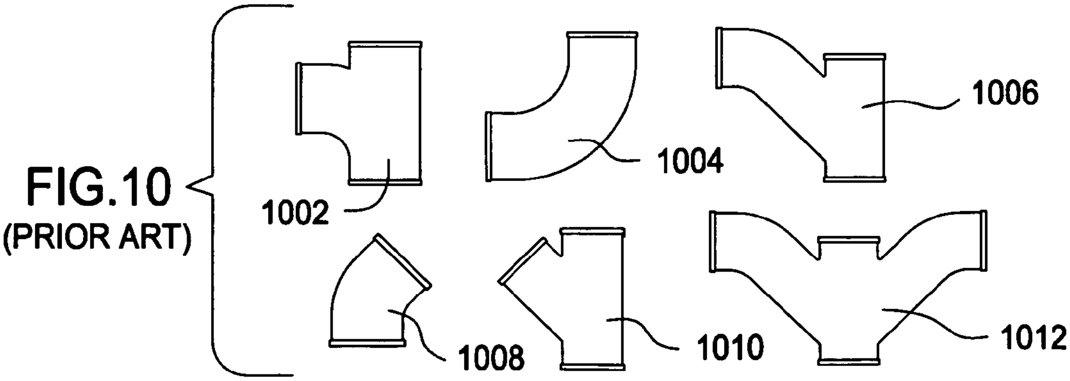
FIG.10 (PRIOR ART)
FIG. 10 (prior art) is a top plan view of examples of pipe fittings.

Piping system installers will typically determine the properties and location of a piping system outline by referring to a design specification such as blueprint 206 (as described with respect to FIG. 1) and/or by referring to physical features of the structure. With the help of information from the design specification and/or physical features of the structure, piping system installers may mark the location of components of the piping system such as pipe section 208. FIG. 2 shows an example of installers **204*a* and 204*b* using chalk line 210 to mark pipe section 208**.

Where two or more sections of pipe are to be connected, a pipe fitting may be used to join the pipe sections together. An example of such intersection is where pipe section 216 is joined with pipe section 218 by pipe fitting 302. By way of example and not of limitation, FIG. 10 shows a small subset of the vast number of different types of fittings that may be used to join sections of pipe together.

Figure 3:
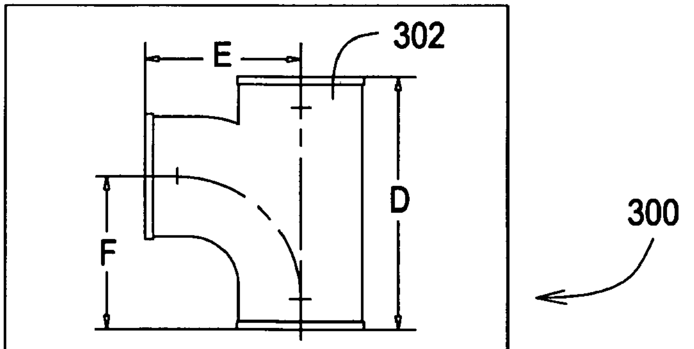
FIG.3 (PRIOR ART)
FIG. 3 (prior art) is a top plan view of a page of a pipe fitting manufacturer's catalog.

In order to complete the piping system outline, the installer will need to create outlines of the appropriate pipe fittings at locations where two or more sections of pipe connect. The prior art method of creating an outline of a pipe fitting generally comprises the following procedure. The installer first searches manufacturer's catalog 214 for the appropriate pipe fitting. FIG. 3 shows sample page 300 from manufacturer's catalog 214 for pipe fitting 302. The installer determines the appropriate dimensions for pipe fitting 302 (D, F, and E) by locating the row corresponding to the appropriate pipe fitting size and noting the corresponding dimensions. For example, if an installer were creating an outline for a size 3 SAN TEE pipe fitting, the installer would locate the row on sample page 300 corresponding to size 3. The installer would then note that dimension D is equal to 5, dimension F is equal to 8, and dimension E is equal to 5.

Once the installer determines the appropriate dimensions of the pipe fitting, such as dimensions D, F, and E for pipe fitting 302, the installer plots these dimensions on surface 202 using a measuring instrument such as a tape measure or ruler. In this manner, the installer creates an outline of the pipe fitting (which is part of the overall piping system outline 200).

Figure 4:
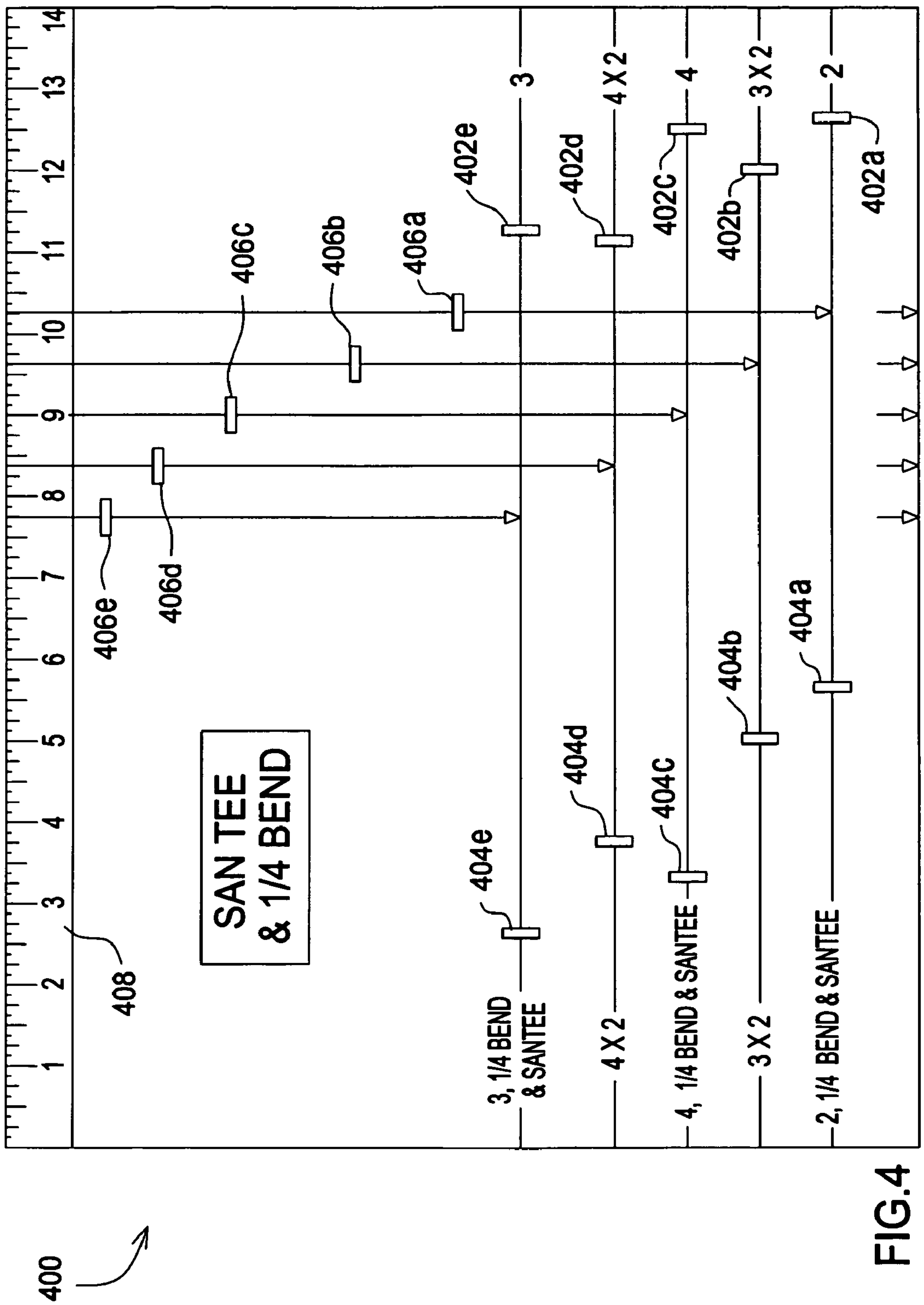
FIG. 4 is a top plan view of an embodiment of a pipe fitting template.

FIG. 4 is a top plan view of an embodiment of a pipe fitting template. As was discussed with respect to FIG. 2, when a piping system installer creates an outline of a piping system, the installer must create outlines for each pipe fitting. As was discussed with respect to FIG. 2, the prior art method of creating a pipe fitting outline involves looking up dimensions in a catalog and plotting the appropriate dimensions on the outline surface using a measuring instrument such as a tape measure. Unfortunately, this procedure is time consuming and error prone. The installer must take time to look up the dimensions in the catalog and then accurately plot the dimensions using a measuring instrument. Additionally, the installer may obtain the wrong the dimensions from the catalog or improperly plot the dimensions on the outline's surface.

A pipe fitting template provides a piping system installer an alternative method of creating a piping fitting outline. Pipe fitting template embodiment 400 comprises marking holes corresponding to key locations of various pipe fittings. By way of example and not of limitation, template 400 comprises marking holes for five different sizes of SAN TEE pipe fittings as well as for three different sizes of QUARTER BEND pipe fittings. It is to be understood that template 400 could comprise marking holes for any number of different pipe fittings.

The marking holes are represented by reference numbers 402*a*-402*e*, 404*a*-404*e*, and 406*a*-406*e*. Marking holes 402*a*, 404*a*, and 406*a* correspond to a 2" SAN TEE pipe fitting. Marking holes 402*b*, 404*b*, and 406*b* correspond to a 3"×2" SAN TEE pipe fitting. Marking holes 402*c*, 404*c*, and 406*c* correspond to a 4" SAN TEE pipe fitting. Marking holes 402*d*, 404*d*, and 406*d* correspond to a 4"×2" SAN TEE pipe fitting.

Marking holes 402*e*, 404*e*, and 406*e* correspond to a 3" SAN TEE pipe fitting. Marking holes 404*a* and 406*a* correspond to a 2" QUARTER BEND pipe fitting. Marking holes 404*c* and 406*c* correspond to a 4" QUARTER BEND pipe fitting. Marking holes 404*e* and 406*e* correspond to a 3" QUARTER BEND pipe fitting. Template 400 may also comprise ruler 408 to aid an installer installing sections of pipe.

Figure 8:
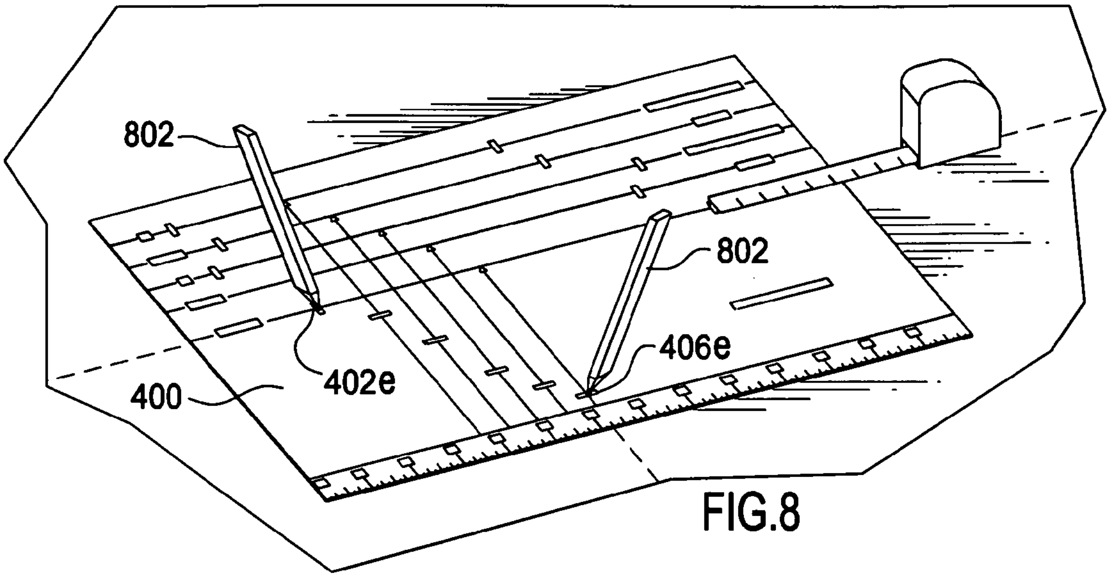
FIG. 8 is a top perspective view of use of a pipe fitting template.

An example of operation of template 400 is as follows. If an installer wishes to create an outline for a size 3" SAN TEE pipe fitting, the installer places template 400 such that marking hole 402*e* is located where the pipe fitting is to start. Using a marking instrument such as a piece of chalk, the installer places a mark on the outline surface through hole 402*e*. The installer locates the remaining two marking holes corresponding to a 3" SAN TEE pipe fitting. These are marking holes 404*e* and 406*e*. The "e" designation is common to all the holes. The installer places a mark in the outline surface through marking holes 404*e* and 406*e*. FIG. 8 shows an example of an installer marking the outline surface through marking holes 402*e* and 406*e* using chalk 802.

Figure 9:
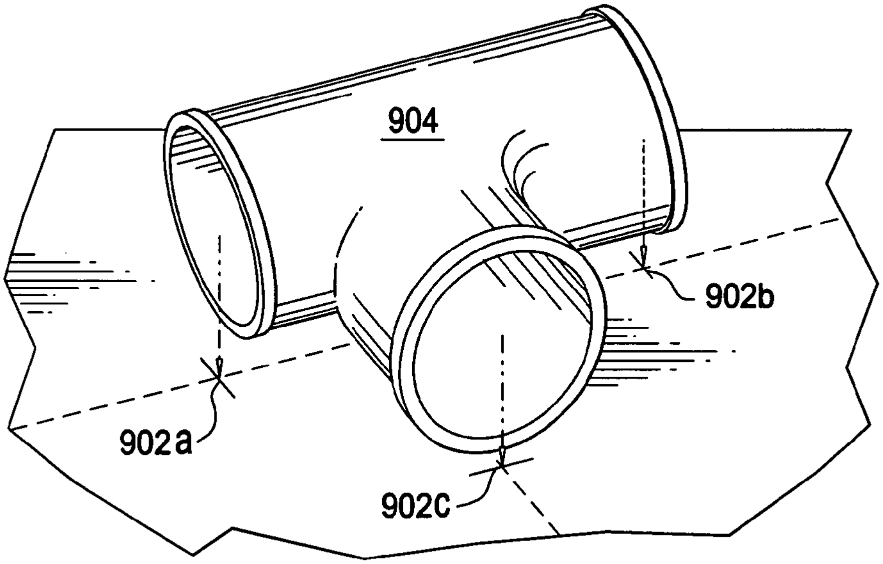
FIG. 9 is a top perspective view of a pipe fitting superimposed over a pipe fitting outline created by a pipe fitting template.

The installer removes template 400. The marks on the outline surface correspond to the ends of the 3" SAN TEE fitting. An example of an outline created by a pipe fitting template is shown in FIG. 9. FIG. 9 shows how outline points 902*a*, 902*b*, and 902*c* correspond to the ends of corresponding pipe fitting 904. It should be noted that by using a template to create an outline of a pipe fitting, the installer does not need to search for dimensions in a manufacturer's catalog or plot distances using a tape measure or other measuring instrument.

Another example of operation of template 400 is as follows. If a user wishes to create an outline for a 2" QUARTER BEND pipe fitting, the user places template 400 such that marking hole 404*a* is located over top of the location where the QUARTER BEND fitting is to start. A QUARTER BEND is a right angle section. The user then marks the surface of the outline through marking hole 404*a*. The user locates the corresponding marking hole 406*a* and marks the outline surface through this hole. The user removes template 400. An outline corresponding to the two ends of a 2" QUARTER BEND template remain on the outline surface.

Figure 5:
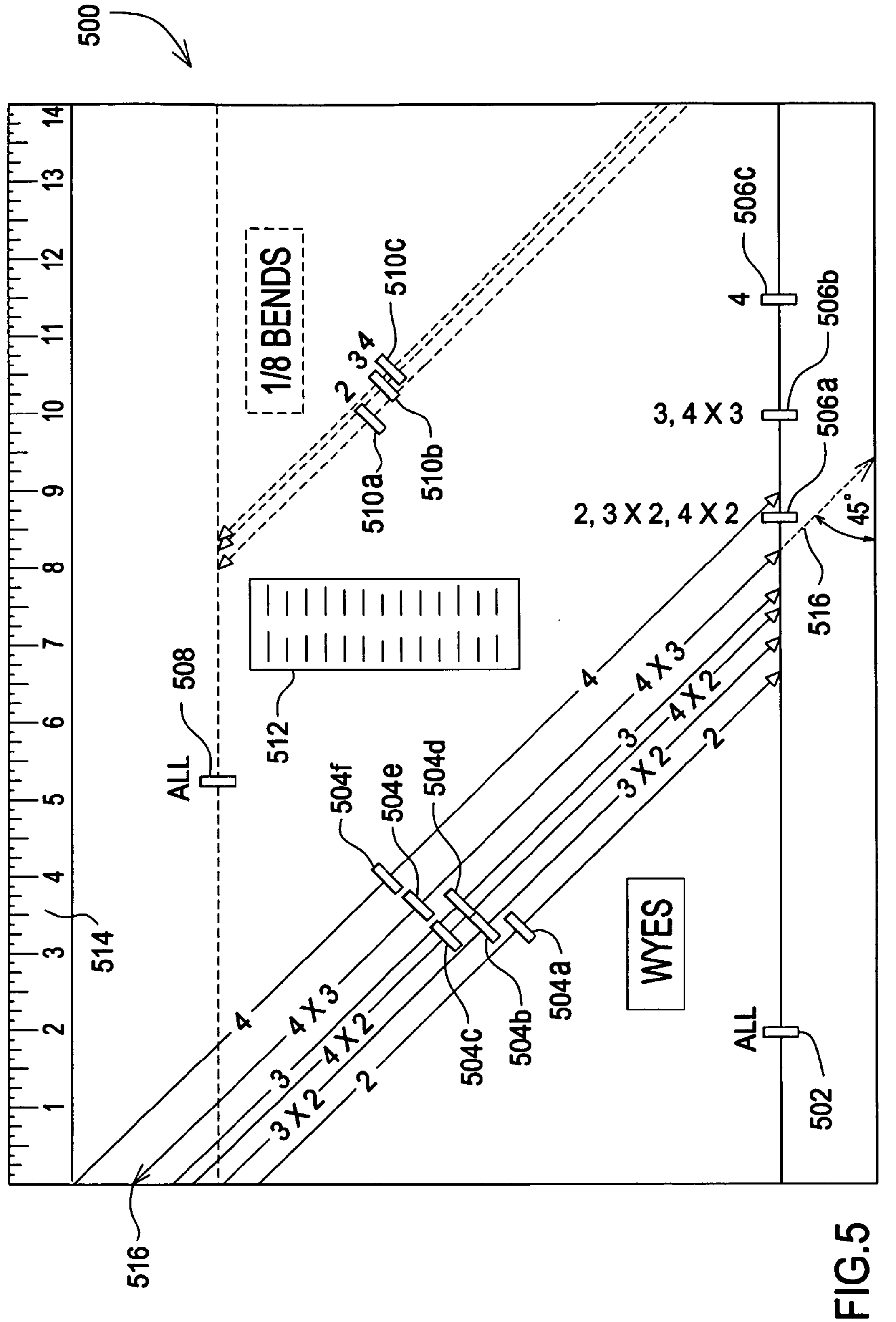
FIG. 5 is a top plan view of an embodiment of a pipe fitting template.

FIG. 5 is a top plan view of an embodiment of a pipe fitting template. Template 500 is similar to template 400, however, template 500 comprises marking holes for a different set of pipe fittings than template 400. By way of example and not of limitation, template 500 comprises marking holes for six different sizes of WYE pipe fittings as well as for three different sizes of EIGHTH BEND pipe fittings. A WYE fitting is shaped like the letter Y. An EIGTH BEND is shaped like a 45° angle bend. It is to be understood that template 500 could comprise marking holes for any number of different pipe fittings.

The marking holes for the WYE pipe fittings are represented by reference numbers 502, 504*a*-504*f*, and 506*a*-506*c*. Marking hole 502 (which may be labeled "ALL") is used for all WYE pipe fittings. The user selects the appropriate remaining marking holes from sets 504*a*-504*f* and 506*a*-506*c* depending on the size of WYE pipe fitting that the user wishes to create an outline for.

The marking holes for the EIGHTH BEND pipe fittings are represented by reference numbers 508 and 510*a*-510*c*. Marking hole 508 (which may be labeled "ALL") is used for all EIGHTH BEND pipe fittings. The user selects the appropriate marking hole from set 510*a*-510*c* depending on the size of the EIGHTH BEND pipe fitting that the user wishes to create an outline for.

An example of a use of template 500 to create an outline for a 2" WYE pipe fitting is as follows. The user places template 500 such that marking hole 502 is located over top of the location where the WYE fitting is to start. The user marks the surface of the outline through marking hole 502. The user locates the remaining two marking holes corresponding to a 2" WYE pipe fitting. These marking holes are 504*a* and 506*a*. The user marks the outline surface through marking holes 504*a* and 506*a*. The user removes template 500. An outline corresponding to the three ends of a 2" WYE pipe fitting remains on the outline surface.

An example of a use of template 500 to create an outline for a 2" EIGHTH BEND pipe fitting is as follows. The user places template 500 such that marking hole 508 is located over top of the location where the EIGHTH BEND fitting is to start. The user marks the surface of the outline through marking hole 508. The user then locates the remaining marking hole corresponding to a 2" EIGHTH BEND fitting. This marking hole is 510*a*. The user marks the surface of the outline through marking hole 510*a*. The user removes template 500. An outline corresponding to the two ends of a 2" EIGHTH BEND pipe fitting remains on the outline surface.

A pipe fitting template, such as template 500, may also comprise one or more informational sources to aid the piping system installer. For example, a template may comprise conversion chart 512 which helps an installer calculate lengths needed to create a forty five degree angle. As another example, a template may comprise directional indicators 516 indicating a forty-five degree angle. Furthermore, a template may comprise ruler 514 to aid an installer installing sections of pipe.

Figure 6:
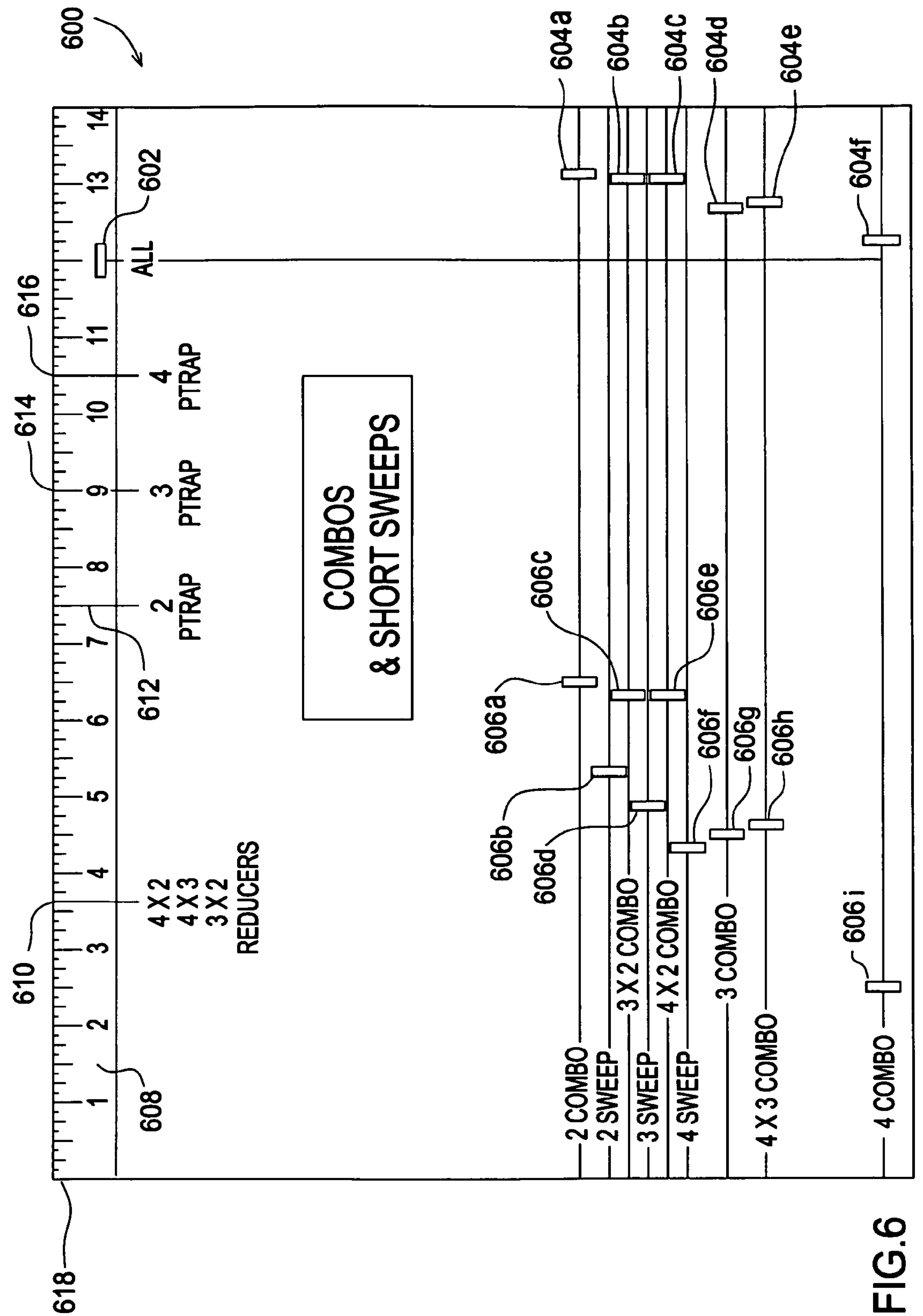
FIG. 6 is a top plan view of an embodiment of a pipe fitting template.

FIG. 6 is a top plan view of an embodiment of a pipe fitting template. Template 600 is an embodiment of a pipe fitting template comprising marking holes for six different sizes of COMBINATION pipe fittings and three different sizes of SWEEP pipe fittings. Template 600 also comprises location markers for three different sizes of REDUCER pipe fittings and three different sizes of PTRAP pipe fittings. It is to be understood that template 600 could comprise marking holes and/or location markers for any number of different pipe fittings.

Marking hole 602 is used for all COMBINATION and SWEEP pipe fittings. Marking holes 606*a*, 606*c*, 606*e*, 606*g*, 606*h*, and 606*i* correspond to a second end of a COMBINATION pipe fitting. Marking holes 604*a*, 604*b*, 604*c*, 604*d*, 604*e*, and 604*f* correspond to a third end of a COMBINA- TION pipe fitting. Marking holes 606*b*, 606*d*, and 606*f* correspond to a second end of a SWEEP pipe fitting.

An example of a use of template 600 to create an outline for a 4"×3" COMBINATION pipe fitting is as follows. The user first places template 600 such that marking hole 602 is located over top of the location where the COMBINATION fitting is to start. The user marks the surface of the outline through marking hole 602. The user then locates the remaining two marking holes for a 4"×3" COMBINATION which are marking holes 606*h* and 604*e*. The user marks the surface of the outline through marking holes 606*h* and 604*e*. The user removes template 600. An outline corresponding to the three ends of a 4"×3" COMBINATION pipe fitting remains on the outline surface.

An example of a use of template 600 to create an outline for a 2" SWEEP pipe fitting is as follows. The user places template 600 such that marking hole 602 is located over top of the location where the SWEEP fitting is to start. The user marks the surface of the outline through marking hole 602. The user locates the remaining marking hole corresponding to a 2" SWEEP which is marking hole 606*b*. The user marks the surface of the outline through marking hole 606*b*. The user removes template 600. An outline corresponding to the two ends of a 2" SWEEP pipe fitting remains on the outline surface.

Template 600 may also be to create an outline for 4"×2", 4"×3", and 3"×2" REDUCER pipe fittings. The user first places top, left corner 618 of template 600 at the location where the REDUCER is to start. The user marks top, left corner 618 on the outline surface. The user then marks location 610 on the outline surface. The user removes template 600 and is left with an outline comprising the two ends of a REDUCER.

Similarly, template 600 may be used to create an outline of a PTRAP pipe fitting. The user first places top, left corner 618 of template 600 at the location where the PTRAP pipe fitting is to start. The user marks this location on the outline surface. The user next selects the appropriate location marker 612, 614, or 616 corresponding to the PTRAP size and places a mark on the outline surface at this location. The user removes template 600 and is left with an outline of the end to center of a PTRAP pipe fitting.

Figure 7:
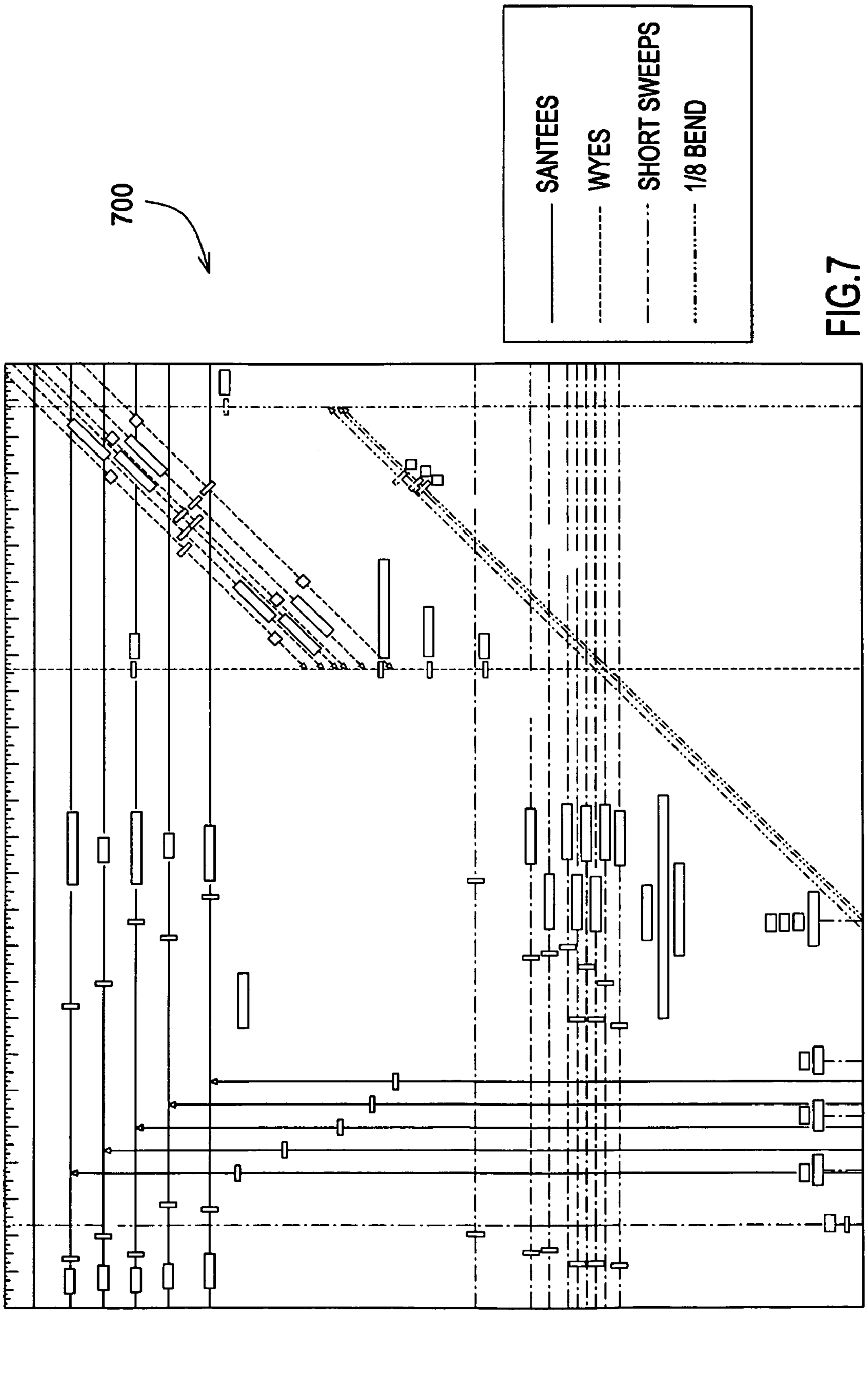
FIG. 7 is a top plan view of an embodiment of a pipe fitting template.

FIG. 7 is a top plan view of an embodiment of a pipe fitting template. This embodiment comprises templates 400, 500, and 600 integrated into single template 700. It is to be understood that template 700 could comprise marking holes and/or location markers for any number of different pipe fittings.

FIG. 10 a top plan view of examples of pipe fittings. The pipe fittings shown in FIG. 10 comprise a small sample of the virtually unlimited number of types of fittings for which an outline could be created of by a pipe fitting template. Shown in FIG. 10 are SAN TEE 1002, sweep 1004, COMBINATION 1006, EIGHTH BEND 1008, WYE 1010, and DOUBLE COMBINATION 1012 pipe fittings.

Figure 11:
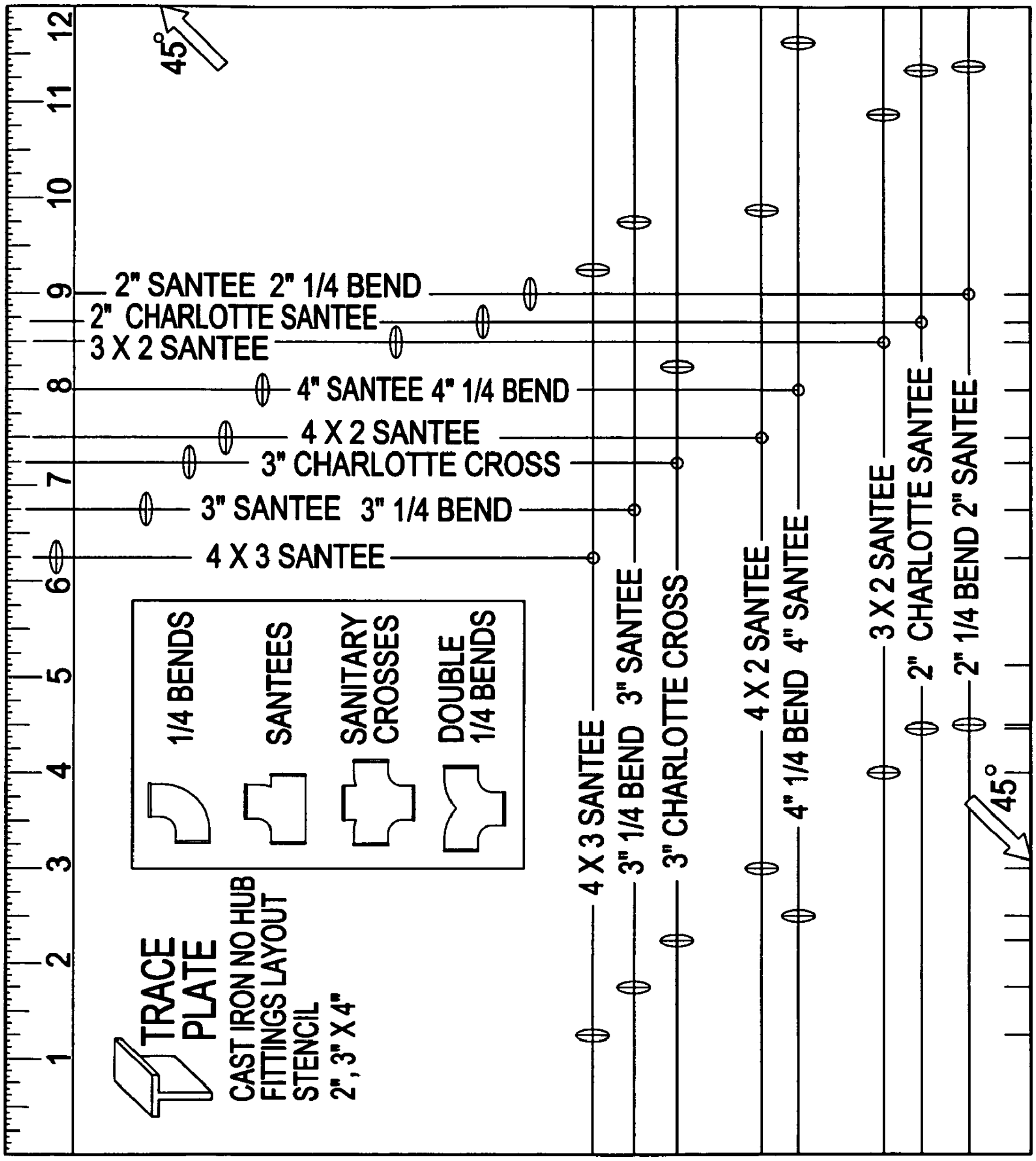
FIG. 11 is a top plan view of an embodiment of a pipe fitting template.

FIG. 11 is a top plan view of an embodiment of a pipe fitting template. It carries hole markings for ¼ Bends, Santees, Sanitary Crosses and Double ¼ Bends.

Additionally, sizes of 2, 3 and inch pipe are included. A ruler and a 45° line marker are included.

Figure 12:
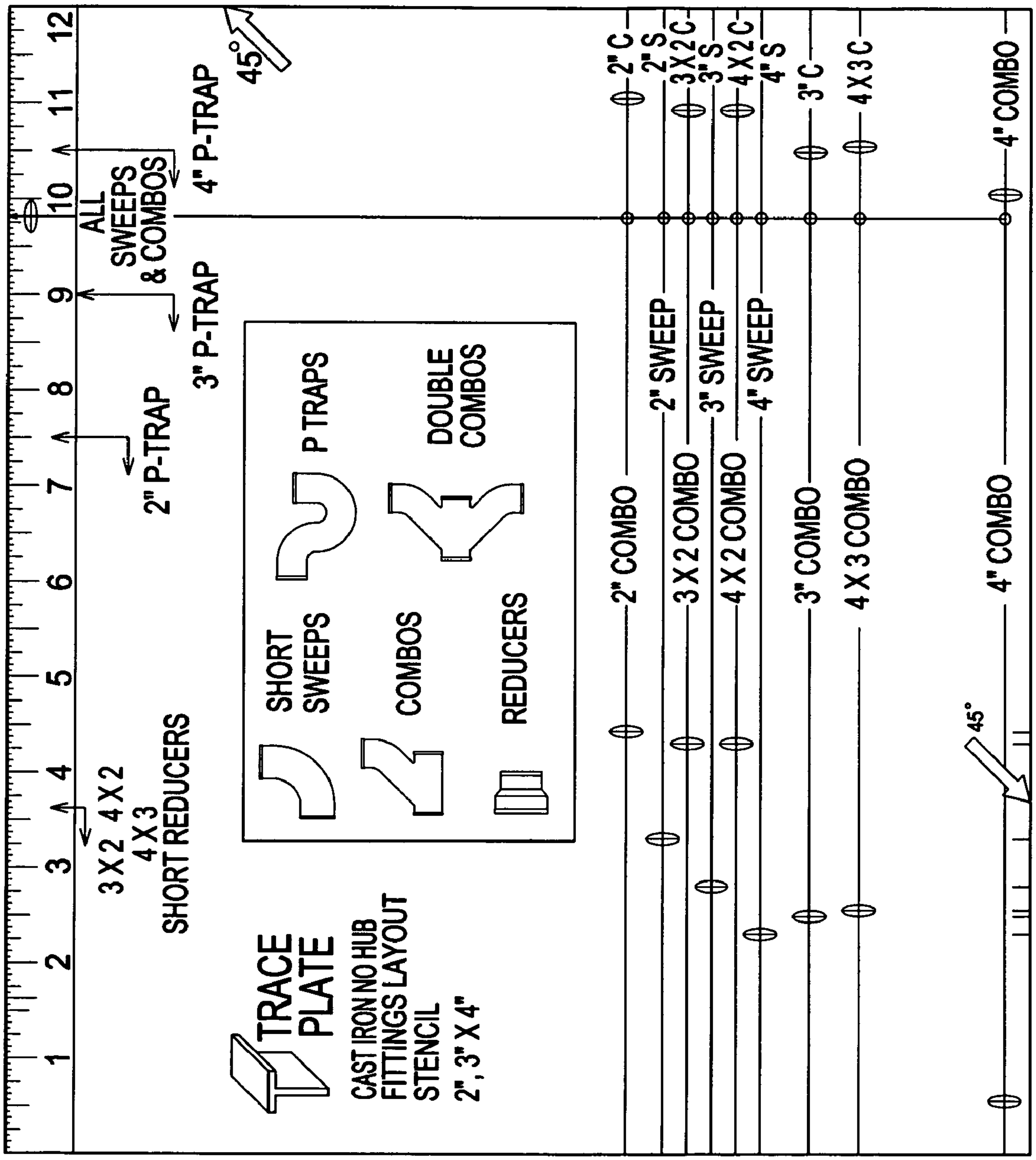
FIG. 12 is a top plan view of an embodiment of a pipe fitting template.

FIG. 12 is a top plan view of an embodiment of a pipe fitting template. It carries hole markings for Short Sweeps, P Traps, Combos, Double Combos and Reducers sizes 2, 3, and 4 inches are included. In addition to the ruler and 45° angle marker, a "1.41" formula marker is included on the ruler. One skilled in the art realizes these markings help calculate a diagonal dimension of a right angle.

Figure 13:
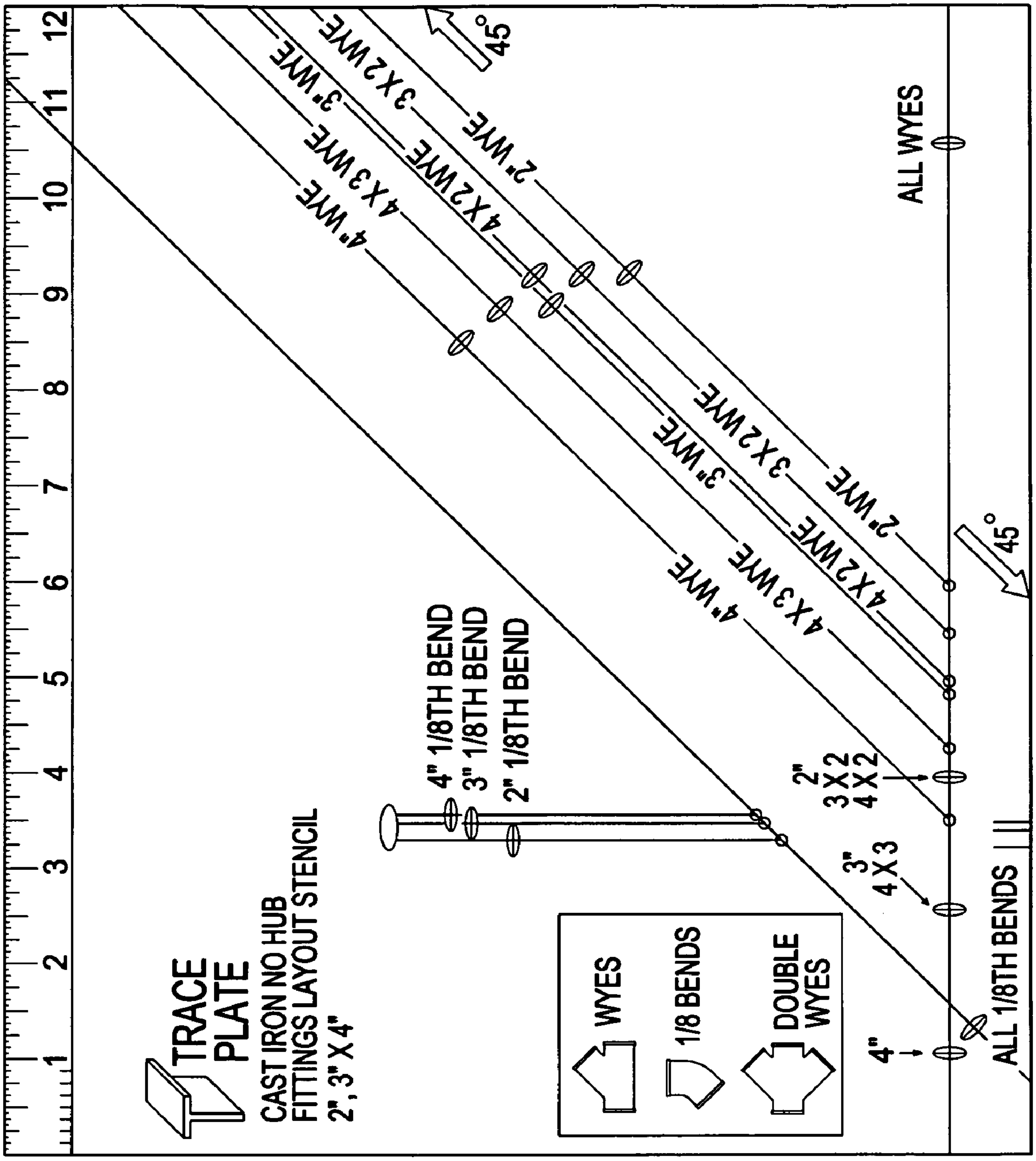
FIG. 13 is a top plan view of an embodiment of a pipe fitting template.

FIG. 13 is a top plan view of an embodiment of a pipe fitting template. It contains hole patterns for Wyes, ⅛ Bends and Double Wyes in 2, 3 and 4 inch sizes.

Preferred construction of all embodiments includes a two sided template with mirror images to lay out left or right orientations of the same fittings. A laminated card stock or a plastic sheet construction is preferred. If plastic is used, then the indentation depth at each open end is adjusted by the installer. After the chalk layouts are completed on the floor, pipe lengths are cut to the measured markings made with the stencil. Fittings and joints are joined with couplings such as a Tyler® No-Hub coupling.

Common terms in the art include penetration holes for holes in floors, walls through which a pipe runs. Intersecting lines means layout drawing lines where two (or more) pipes intersect via a fitting. A plumbing joint is the assembly of the intersecting pipes and the fitting.

It should be noted that some pipe fittings comprise two or more occurrences of another pipe fitting. For example, DOUBLE COMBINATION pipe fitting 1012 comprises two COMBINATION pipe fittings 1006. Each half of DOUBLE COMBINATION pipe fitting 1012 is the mirror image of the other half. Thus, a pipe fitting template that comprises marking holes for a COMBINATION pipe fitting could be used to create an outline for a DOUBLE COMBINATION pipe fitting. An installer would first create an outline of one half of a DOUBLE COMBINATION pipe fitting using a template for a (single) COMBINATION pipe fitting. The installer would next flip the template over and use the template to create an outline for the other half of the DOUBLE COMBINATION pipe fitting. In general, a template that comprises one half of a symmetrical double fitting may be used to create an outline of the entire fitting by using the template to create one half of the outline and then flipping the template over to create the other half of the outline.

In summary, a method is described to lay out a piping system comprising the steps of (1) choosing a set of commonly used pipe fittings, (2) punching holes representing a plurality of said chosen pipe fittings in a template, and (3) marking a pipe layout on a flat surface using the template to draw at least one pipe fitting in the piping system. Finally, the pipe segments are cut and the fittings and pipes are mounted.

While a number of exemplifying features and embodiments have been discussed above, those of skill in the art will recognize certain modifications, permutations, additions and subcombinations thereof. No limitation with respect to the specific embodiments disclosed herein is intended or should be inferred.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A method to lay out a plumbing system, the method comprising the steps of:

marking penetration holes and all connecting pipes on a flat surface;

drawing all intersecting lines among the connecting pipes and the penetration holes on the flat surface;

designating a first fitting to complete a first plumbing joint at a set of intersecting lines;

chosing a stencil having at least one combination of holes representing the first fitting;

placing the stencil atop the intersecting lines of the first plumbing joint;

using the stencil holes, marking on top of the intersecting lines a set of dimensions for the first fitting; and measuring the required pipe lengths between the first fitting and an adjacent fitting.

2. The method of claim 1 further comprising the step of adding a second combination of holes on the stencil representing a second fitting.

3. The method of claim 2 further comprising the step of adding a ruler, a 45° angle, a 90° angle and a rule 1.41 marking on the ruler.

4. The method of claim 3 further comprising the step of adding labeled drawings of the stencil's fittings on the stencil.

5. The method of claim 1 further comprising the step of forming a mirror image of the stencil on a back side thereof.

6. The method of claim 1 further comprising the step of printing instructions for use on the stencil.

7. A stencil for use in correctly marking the dimensions of a pipe fitting on a layout, the stencil comprising:

a first aperture for a first end of a first fitting;

a second aperture for a second end of the first fitting;

a third aperture for a first end of a second fitting; and a fourth aperture for a second end of the second fitting.

* * * * *